(12) United States Patent
King et al.

(10) Patent No.: US 8,458,460 B2
(45) Date of Patent: Jun. 4, 2013

(54) DIGEST GENERATION FROM INSTRUCTION OP-CODES

(75) Inventors: Steven R. King, Portland, OR (US); Erik J. Johnson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1213 days.

(21) Appl. No.: 11/863,137

(22) Filed: Sep. 27, 2007

(65) Prior Publication Data

US 2009/0089578 A1 Apr. 2, 2009

(51) Int. Cl.
*G06F 11/30* (2006.01)
*G08B 23/00* (2006.01)

(52) U.S. Cl.
USPC ............... 713/161; 713/187; 726/24; 726/25

(58) Field of Classification Search
USPC ............. 713/161, 167, 190, 193; 726/21–25, 726/27–30
See application file for complete search history.

(56) References Cited

U.S. PATENT DOCUMENTS

| | | | | |
|---|---|---|---|---|
| 4,558,302 A | * | 12/1985 | Welch | 341/51 |
| 5,757,900 A | * | 5/1998 | Nagel et al. | 379/221.09 |
| 5,903,760 A | * | 5/1999 | Farber et al. | 717/146 |
| 5,928,362 A | * | 7/1999 | Cardillo et al. | 726/20 |
| 6,490,685 B1 | * | 12/2002 | Nakamura | 713/193 |
| 6,567,917 B1 | * | 5/2003 | Ziese | 713/187 |
| 6,757,717 B1 | * | 6/2004 | Goldstein | 709/217 |
| 6,912,512 B2 | * | 6/2005 | Miyazaki et al. | 705/51 |
| 6,990,612 B2 | * | 1/2006 | Dwyer | 714/47.1 |
| 7,346,780 B2 | * | 3/2008 | Sinha et al. | 713/187 |
| 7,475,095 B2 | * | 1/2009 | Holden et al. | 1/1 |
| 7,519,993 B2 | * | 4/2009 | Hasegawa et al. | 726/21 |
| 7,523,098 B2 | * | 4/2009 | Hirsch et al. | 1/1 |
| 7,694,121 B2 | * | 4/2010 | Willman et al. | 713/2 |
| 7,720,219 B1 | * | 5/2010 | Olson et al. | 380/28 |
| 7,752,465 B2 | * | 7/2010 | Ebringer et al. | 713/194 |
| 7,984,304 B1 | * | 7/2011 | Waldspurger et al. | 713/187 |
| 2003/0217277 A1 | * | 11/2003 | Narayanan | 713/187 |
| 2004/0103291 A1 | * | 5/2004 | Craft | 713/193 |
| 2004/0177369 A1 | * | 9/2004 | Akins, III | 725/31 |
| 2004/0210885 A1 | * | 10/2004 | Wang et al. | 717/158 |
| 2005/0005157 A1 | * | 1/2005 | Folmsbee | 713/200 |
| 2005/0188219 A1 | * | 8/2005 | Annic et al. | 713/200 |
| 2005/0198051 A1 | * | 9/2005 | Marr et al. | 707/100 |
| 2006/0122960 A1 | * | 6/2006 | Suganuma et al. | 707/1 |
| 2007/0074046 A1 | * | 3/2007 | Czajkowski et al. | 713/190 |
| 2009/0262925 A1 | * | 10/2009 | Vijayarangan | 380/29 |
| 2010/0070775 A1 | * | 3/2010 | Dik et al. | 713/187 |

OTHER PUBLICATIONS

Jeff Weeks and Code X Software; Intel Instruction Format; 1997.; pp. 3, http://kos.enix.org/pub/iinfor.html, Site last visited Sep. 18, 2007.

* cited by examiner

*Primary Examiner* — Eleni Shiferaw
*Assistant Examiner* — Phy Anh Vu

(57) ABSTRACT

In general, in one aspect, a computer-implemented method includes determining a digest value based on hash operations on values of, at least, a set op-codes of multiple instructions of a program during execution of the program by a processor.

26 Claims, 5 Drawing Sheets

DIGEST GENERATION FROM INSTRUCTION OP-CODES

BACKGROUND

Increasingly, computer applications interact cooperatively across different network nodes. For example, on-line gaming typically features player client programs interacting with a gaming server that reconciles and responds to the actions taken by the different players. This distributed architecture, however, has proven highly susceptible to cheating. For example, some software developers provide unscrupulous users with computer programs that modify or replace the authorized client software. These programs can provide unfair advantages, for example, by replacing human interaction with computer generated responses (e.g., automated targeting). In multi-player games, this offers a very un-level playing field for gamers. On-line gaming is just one example of the difficulty in providing trusted computing in a distributed or otherwise unprotected environment.

DETAILED DESCRIPTION

Figure 1:
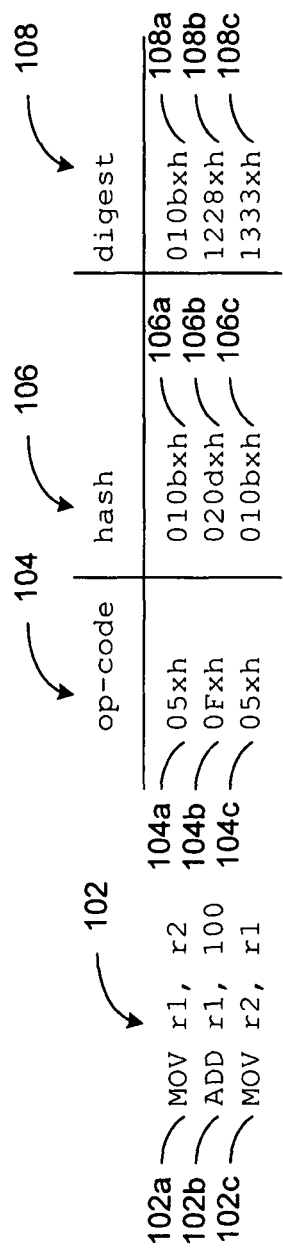
FIG. 1 illustrates generation of a digest value for a set of instructions.

FIG. 1 illustrates a technique that generates a digest value 108a-108c representing instructions 102a-102c of a program executed by a processor. As shown, during execution of a program 102, a digest value 108a-108c is updated for each instruction 102a-102c. This digest value 108 can, with very high likelihood, be used to determine that a set of instructions 102a-102c were actually executed by a processor. For example, comparing the digest value 108 with an expected digest value can be used to determine whether an authorized program is interacting with a server instead of an unauthorized or modified program.

In greater detail, FIG. 1 lists instructions 102a-102c of a program in assembly code mnemonics for ease of illustration. As shown, a given instruction 102a-102c features a binary op-code identifying what operation a processor is to perform during instruction execution. For example, a "MOV" instruction 102a may have a binary op-code of "00000101" (05xh). Many instructions operate on operands. For example, instruction 102a uses registers r1 and r2 as operands. In addition to op-codes and operands, a given instruction may feature other fields such as the operand-size, address-size, option instruction prefix, and so forth.

As shown, the op-code 106a-106c of each instruction contributes to the generation of a digest value 108a-108c. In the example shown, the op-code 104a-104c undergoes a hash operation that transforms the op-code 104a-104c into a hash value 106a-106c. For example, the hash operation may be a cryptographically strong algorithm such as a SHA (Secure Hash Algorithm) (e.g., SHA-256) or a non-cryptographic algorithm such as a CRC (Cyclic Redundancy Check) (e.g., CRC32). The digest value 108a-108c represents an accumulation of the hash values 106a-106c to reflect execution of each instruction 102a-102c. For example, the digest value 108a-108c may represent a simple running accumulation of hash values 106a-106c. Alternately, other aggregation techniques may be used (e.g., XOR-ing a hash value with the current digest value). The digest value 108a-108c may also be a function of the previous digest value 108a-108c and an additional op-code (e.g., digest=hash (digest value, op-code)). Such approaches can produce different digest values for the same set of instructions executed in a different order.

The hash value may be of a different data width than the op-code width. For example, a hash value may feature fewer bits than an op-code to compactly represent an instruction. Alternately, a hash value may feature more bits than an op-code to map the op-codes into a larger space and reduce the likelihood that a sequence of op-codes would generate the same accumulated hash values.

As shown, the hash operation operates solely on the op-codes of an instruction. In some systems, the op-code also encodes operands on an instruction though in others this information is stored in a separate instruction field. In some implementations, in addition to the instruction op-code, the hash operation may also include the encoding of operands, flags, or processor state information. In most implementations, the hash operation does not operate on the values stored in the operands or the instruction address of an op-code to make the hash output memory location independent and independent of data values. However, in other implementations such data may be used, though such information may reflect the operational state of a program which may vary significantly across different executions and make comparison with an expected value more difficult.

Figure 2:
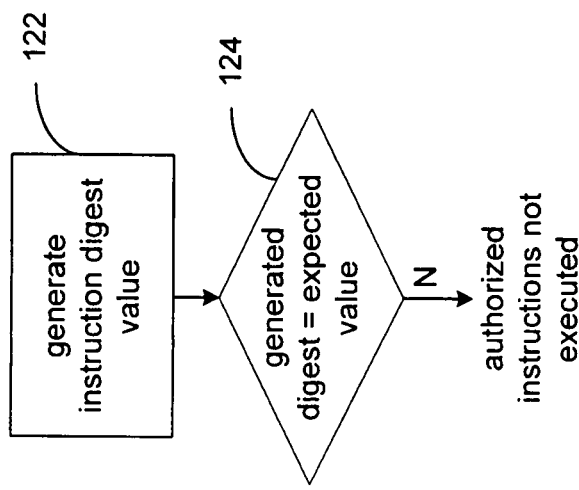
FIG. 2 is a flow-chart of a process to compare a digest value of a set of instructions with an expected value.

As shown in FIG. 2, since the digest value 122 is a direct measurement of execution history, comparing 124 this hash value with an expected value can provide a measure of confidence that a body of code executed without modification. Such techniques can be used in a wide variety of applications. For example, the technique above may be used in trusted computing applications, such as online gaming or Internet voting. For example, a digest value 108 can be included in a network packet (e.g., in an IP (Internet Protocol) datagram and/or a Transmission Control Protocol (TCP) segment) and transmitted to a server for comparison with an expected value or set of expected values. The digest value 108 may be transformed prior to or after inclusion in the packet, for example, by a key to permit authentication of the value. A remote node (e.g., a node having a different Internet Protocol address) can then compare the digest value or transformed digest value with an expected value. The techniques may also be used in other applications. For example, in an automated regression testing environment, the digest value can attest that a program executed an expected set of instructions in an expected order in response to a set of test data.

Figure 3:
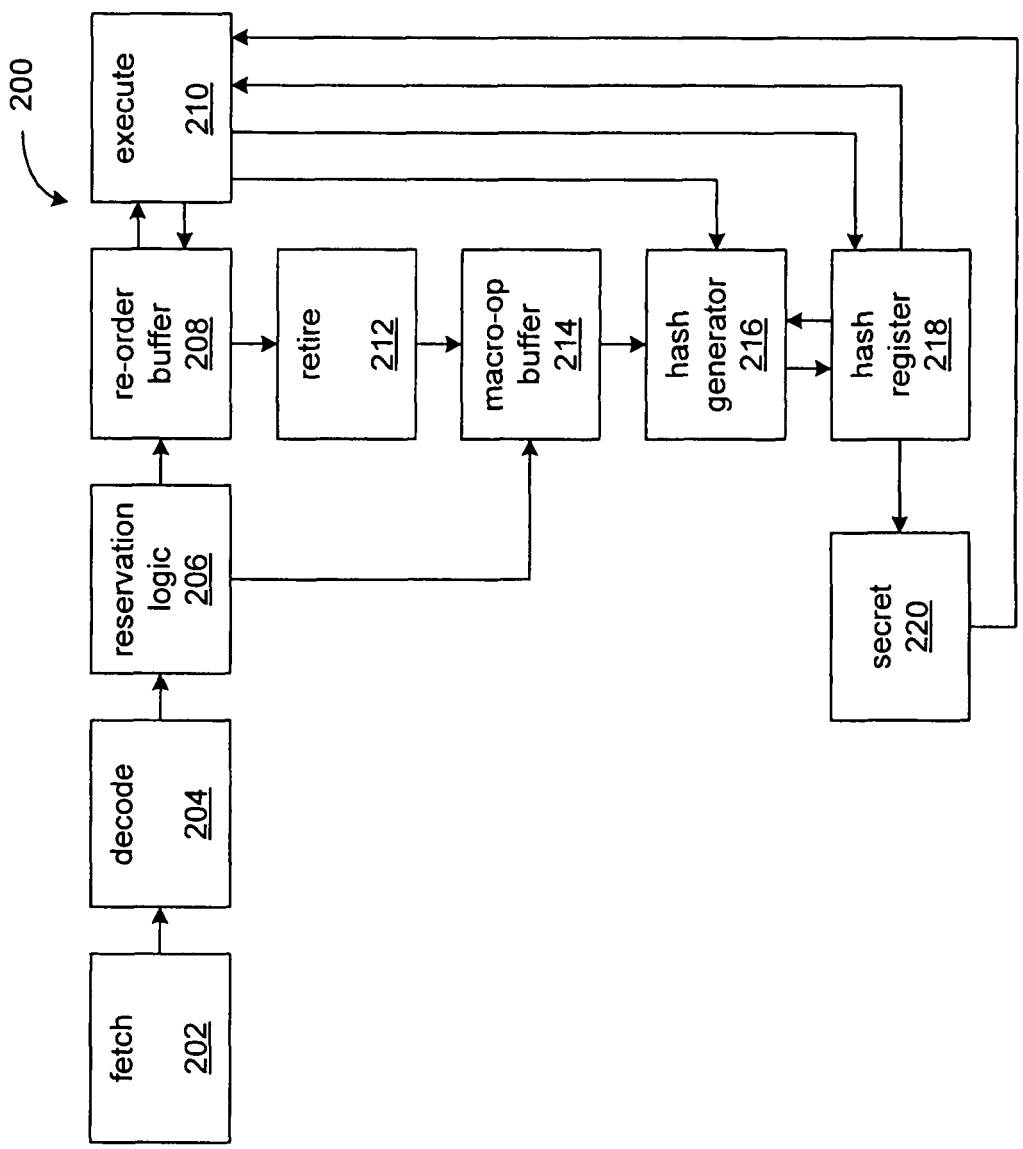
FIG. 3 is a diagram of a processor.

The techniques describe above may be implemented in a variety of ways. For example, FIG. 3 illustrates a pipelined processor 200 architecture that includes logic blocks 216, 218 to determine digest values based on instructions executed by the processor 200. By integrating the logic into the processor 200, the digest value can be determined without dependence on, and regardless of the integrity of the surrounding software. That is, the security scheme is less vulnerable to tampering by an operating system, drivers, a VMM (Virtual Machine Monitor) layer, processor simulator, etc.

The processor 200 shown features a fetch block 202 that retrieves a macro instruction op-code (macro-op) from an instruction store (e.g., an instruction cache) and sends the op-code to the decode logic in program order. The decode block 204 decomposes the macro-op into one or more micro-ops and forwards the macro-op and micro-ops to reservation logic 206. The reservation block 206 allocates entries for the micro-ops in a re-order buffer block 208 that maintains the state of the micro-ops. Each micro-op entry in the buffer 208 has an associated reservation ID. The reservation block 206 also notifies a macro-op buffer block 214 of the macro opcode and the reservation ID of the last micro-op to be executed for the macro op. The execute block 210 executes the micro-ops and updates the re-order buffer 208 to reflect micro-op execution. When micro-ops are marked in the re-order buffer 208 as executed by the execute block 210, a retire block 212 removes the micro-ops from the re-order buffer 208 and provides the reservation ID to the macro-op buffer block 214. When the macro-op buffer block 214 detects the reservation ID of the last micro-op to be executed for a given macro op, the macro-op buffer block 214 can both retire the macro-op from the macro-op buffer block 214 and present the macro op to the hash generator block 216. Regardless of when a macro-op is retired, the hash generator block may process the macro-op in instruction execution order. This may require buffering of a macro-op in the hash generator block or selecting among multiple macro-ops retired on the same cycle, for example, by reservation ID.

The hash generator block 216 transforms the bits of the macro-op code into a hash value. The hash generator block 216 may be composed of several stages, e.g., a pipeline, to increase hashing throughput at the expense of latency in computing the hash value. If the hashing logic design is such that it may fall behind the retirement rate, the hash generator block 216 can supply back pressure to stall the pipeline or may feature a buffer to queue retired macro-ops. The hash register block 218 stores an accumulated hash value.

The processor 200 shown may feature instructions for use with the digest generation scheme. For example, the hash value mechanism may be enabled or disabled by processor instructions (e.g., DIGEST-ON or DIGEST-OFF instructions). When disabled, the macro-op buffer block 214 ignores all macro-op codes until the block 214 detects the retirement of the macro-op code associated with the instruction to enter digest execution mode The ability to control digest generation can permit programmers or a compiler to isolate sections of code where there is little or no conditional branching. This can ease the task of generating a set of possible expected values. This ability can also permit software systems that are not concerned with security or instruction execution verification to avoid or reduce potential execution or power consumption penalties contributed by digest generation. Macro-op codes of these DIGEST-ON/DIGEST-OFF instructions may either be included or excluded from representation in the digest value.

In addition to an instruction or instructions that enable/disable digest value generation, the processor 200 may feature an instruction that resets the hash register value 218 when executed. The processor 200 may feature an instruction that provides a value to hash generator 216 for representation in the digest value. Such an instruction can permit a program to provide a potentially variable seed starting value to the digest generation. Finally, the processor 200 may feature an instruction that retrieves the digest value 218 or permits use of the hash register 218 as an instruction operand.

Potentially, the processor 200 may feature a secret block 220 to operate on a digest value with a processor secret value. For example, when the digest value is retrieved, the value of the secret block enables a processor to provide attestation to the fact that the digest value was computed by the processor hardware. The attestation may take the form of a cryptographically secure signature of the digest value by the processor secret value.

The processor 200 architecture shown is merely an example, and the techniques can be implemented in a wide variety of other architecture. However, the architecture shown illustrates features that can advantageously be incorporated within other different designs. For example, by having the digest logic operating in parallel with instruction execution, the architecture shown can potentially generate a digest value without a substantial speed performance impact in instruction execution.

Figure 4:
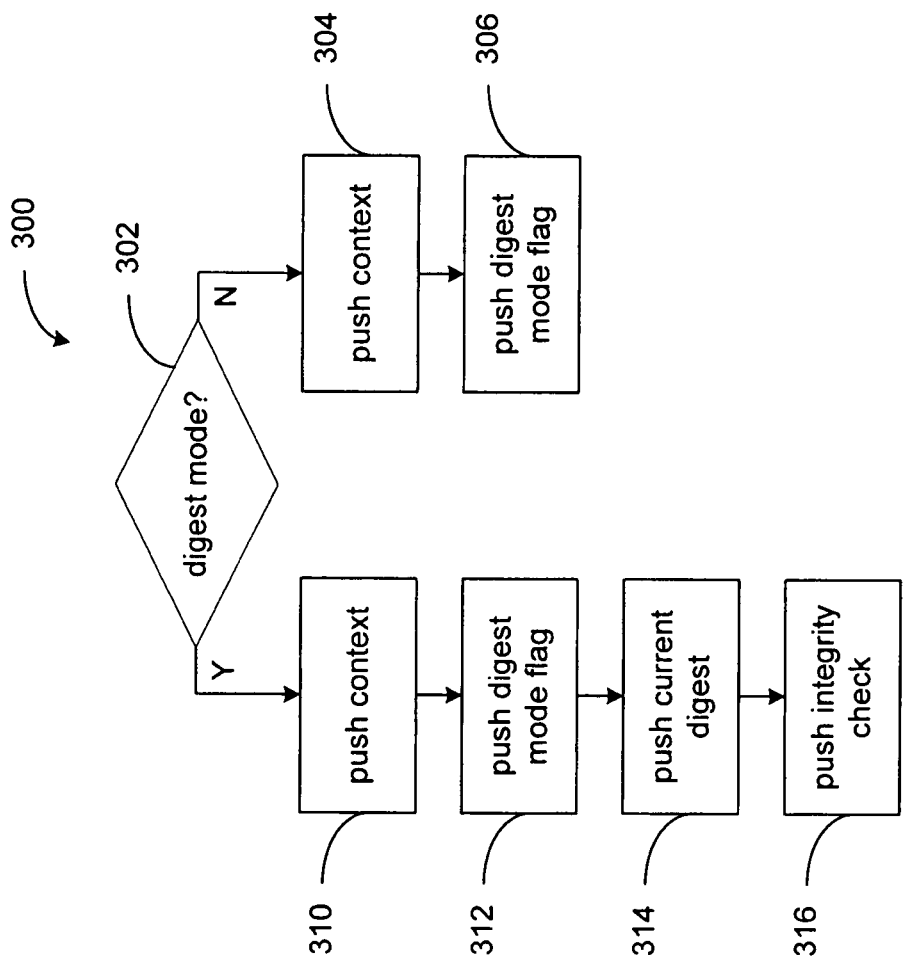
FIGS. 4 and 5 are flow-charts of context switching in a processor that generates a digest value for a set of instructions.

Potentially, the processor 200 may switch between different threads of execution. To preserve a thread-specific digest value, digest data may be included in the thread context saved during a context switch. For example, as shown in FIG. 4, in addition to conventional thread context data 304, 310 (e.g., program counter, flag values, and so forth) data indicating whether digest generation is enabled 312, 314 may also be saved. If digest generation is enabled 302, the current digest value may be saved 314. In addition, an integrity check may also be saved, for example, by cryptographically signing the current digest value with a processor secret key (e.g., by the secret block 220).

Figure 5:
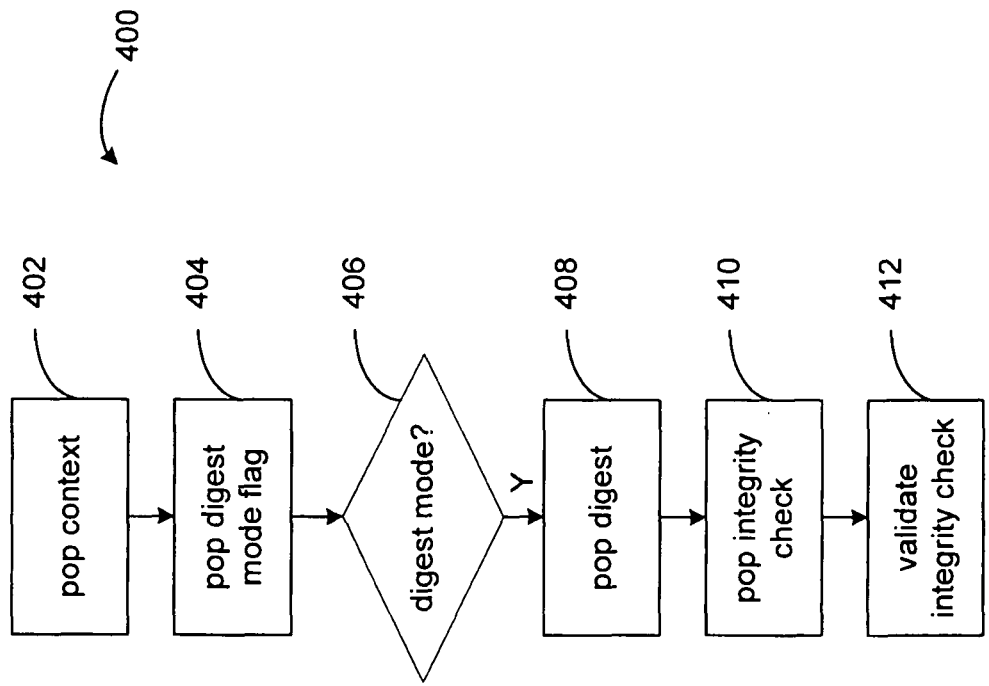

As shown in FIG. 5, when a context is restored 402, if the thread currently has digest generation enabled 406, the current digest value can be restored 408 and the integrity check may be retrieved and compared with a recomputation of an integrity check value, e.g., by the secret block 220, to ensure the digest value has not been tampered with.

Techniques describe herein may be implemented in hardwired circuitry, digital circuitry, analog circuitry, programmable circuitry, and so forth. The programmable circuitry may operate on computer programs. The computer programs may be stored on a computer readable medium and include instructions that cause a processor to operate in ways described above Other embodiments are within the scope of the following claims.

What is claimed is:

1. A computer-implemented method, comprising:
setting a digest value to an initial value; and
updating, by a processor, the digest value based on a sequence of hash operations on values of, at least, a set op-codes of multiple instructions of a program during execution of the multiple instructions of the program by the processor, wherein the sequence of the hash operations is based on an order of actual execution of the multiple instructions of the program by the processor;
wherein a digest value associated with a first order of execution of the multiple instructions is a different value than a digest value associated with a second, different, order of execution of the multiple instructions;
wherein the multiple instructions include at least one conditional instruction; and
wherein the digest value based on the sequence of the hash operations is updated for each of the multiple instructions as each respective instruction of the multiple instructions undergoes an execution process of the processor.

2. The computer-implemented method of claim 1, wherein the hash operations do not operate on values stored in any operands of the multiple instructions.

3. The computer-implemented method of claim 1, comprising: performing at least one comparison of the digest value based on the sequence of the hash operations and at least one expected value.

4. The computer-implemented method of claim 1, further comprising: including data of a digest value in a network packet.

5. The computer-implemented method of claim 1, further comprising:
receiving an instruction indicating that subsequently executed instructions are included in the multiple instructions; and
receiving an instruction indicating that subsequently executed instructions are be included in the multiple instructions.

6. The computer-implemented method of claim 1, further comprising:
performing a transformation of the digest value in accordance with a processor key.

7. The computer-implemented method of claim 1, further comprising:
receiving an instruction that initializes the digest value based on the sequence of the hash operations to a seed value.

8. The computer-implemented method of claim 1, comprising: performing at least one comparison of the digest value based on the sequence of the hash operations and at least a value received in a network packet.

9. The computer-implemented method of claim 1, execution of the multiple instructions comprises: a fetch operation, a decode operation, an execution operation, and a retirement operation.

10. An apparatus to execute program instructions, the apparatus comprising:
a circuitry configured to access instructions of a program and determine a digest value based on a sequence of hash operations on values of, at least, a set op-codes of multiple instructions of a program during execution of the multiple instructions of the program by a processor, wherein the sequence of the hash operations is based on an order of actual execution of the multiple instructions of the program by the processor;
wherein a digest value associated with a first order of execution of the multiple instructions is a different value than a digest value associated with a second, different, order of execution of the multiple instructions;
wherein the multiple instructions may include at least one conditional instruction; and
wherein the digest value based on the sequence of the hash operations is updated for each of the multiple instructions as each respective instruction of the multiple instructions undergoes an execution process of the processor.

11. The apparatus of claim 10, wherein the hash operations do not operate on values stored in any operands of the multiple instructions.

12. The apparatus of claim 10, wherein the apparatus provides:
a processor instruction having an op-code indicating that subsequently executed instructions are included in the multiple instructions; and
a processor instruction having an op-code indicating that subsequently executed instructions are not included in the multiple instructions.

13. The apparatus of claim 10, further comprising: a logic to perform a transformation of an intermediate value of the digest value based on the sequence of the hash operations in accordance with a processor key.

14. The apparatus of claim 10 further provides:
an instruction that initializes the digest value based on the sequence of the hash operations to a seed value.

15. The apparatus of claim 10, further comprising:
an instruction fetch circuitry;
an instruction decode circuitry to operate on instructions fetched by the instruction fetch circuitry;
an instruction execution circuitry to execute the instructions decoded by the instruction decode circuitry; and
a digest circuitry to access instructions, determine the digest value based on the sequence of the hash operations, and write the digest value based on the sequence of the hash operations to a memory.

16. A computer-implemented method, comprising:
accessing, by a processor, a value based on a sequence of hash operations on values of, at least, a set op-codes of multiple instructions of a program during execution of the multiple instructions of the program by a second processor, wherein the sequence of the hash operations is based on an order of actual execution of the multiple instructions by the second processor; and
performing an operation based on the accessed value and an expected value,
wherein a digest value associated with a first order of execution of the multiple instructions is a different value than a digest value associated with a second, different, order of execution of the multiple instructions;
wherein the multiple instructions include at least one conditional instruction; and
wherein the accessed value reflects an update for each of the multiple instructions as each respective instruction of the multiple instructions underwent an execution process of the second processor.

17. The computer-implemented method of claim 16, wherein the hash operations do not operate on values stored in any operands of the multiple instructions.

18. The computer-implemented method of claim 16, wherein the accessed value comprises a value included in a received network packet.

19. The computer-implemented method of claim 16, wherein the accessed value comprises transformation of a value of the hash operations by a key.

20. An apparatus comprises:
a circuitry configured to:
access, at least, an op-code of a first instruction of a program currently loaded in an execution pipeline of a processor;
update a digest value based at least in part on at least one first hash operation based on, at least, the accessed op-code of the first instruction;
access, at least, an op-code of a second instruction of the program currently loaded in the execution pipeline of the processor; and
update the digest value based at least in part on at least one second hash operation based on, at least, the accessed op-code of the second instruction,
wherein an order of the first and second hash operations is based on an order of actual execution of the first and the second instructions of the program by the processor,
wherein a digest value associated with a first order of execution of the first and second instructions is a different value than a digest value associated with a second, different, order of execution of the first and second instructions;
wherein the first and second instructions include at least one conditional instruction.

21. The apparatus of claim 20, wherein the execution pipeline of the processor comprises:
an instruction fetch circuitry;

an instruction decode circuitry to operate on instructions fetched by the instruction fetch circuitry;

an instruction execution circuitry to execute the instructions decoded by the instruction decode circuitry; and a digest circuitry to update the digest value associated with the first order of execution of the first and second instruction.

22. The apparatus of claim 21, wherein the execution pipeline of the processor further comprises:

a storage of a processor key; and a circuitry to digitally sign the digest value associated with the first order of execution of the first and second instruction using the processor key.

23. The apparatus of claim 21, further comprising circuitry to:

compare the digest value associated with the first order of execution of the first and second instruction with an expected digest value.

24. The apparatus of claim 21, wherein the processor comprises: a processor having an instruction op-code identifying a set of at least one subsequently executed instruction that updates the digest value associated with the first order of execution of the first and second instruction.

25. The apparatus of claim 21, wherein the processor comprises: a processor having an instruction op-code to set the digest value associated with the first order of execution of the first and second instruction to a seed value.

26. The apparatus of claim 21, wherein the processor comprises: a processor having at least one instruction op-code that references the digest value associated with the first order of execution of the first and second instruction as an operand.

\* \* \* \* \*